(12) United States Patent
Lagadec et al.

(10) Patent No.: US 9,617,015 B2
(45) Date of Patent: Apr. 11, 2017

(54) METHOD OF COMMANDING AN ATTITUDE CONTROL SYSTEM AND ATTITUDE CONTROL SYSTEM OF A SPACE VEHICLE

(75) Inventors: Kristen Lagadec, Centres (FR); Claire Roche, Toulouse (FR); Jean Sperandei, Toulouse (FR)

(73) Assignees: AIRBUS DEFENCE AND SPACE SAS, Les Mureaux (FR); CENTRE NATIONAL D'ETUDES SPATIALES CNES, Paris (FR)

(*) Notice: Subject to any disclaimer, the term of this patent is extended or adjusted under 35 U.S.C. 154(b) by 1022 days.

(21) Appl. No.: 13/637,668

(22) PCT Filed: Mar. 28, 2011

(86) PCT No.: PCT/EP2011/054721
§ 371 (c)(1),
(2), (4) Date: Jan. 4, 2013

(87) PCT Pub. No.: WO2011/120916
PCT Pub. Date: Oct. 6, 2011

(65) Prior Publication Data
US 2013/0105633 A1    May 2, 2013

(30) Foreign Application Priority Data

Mar. 29, 2010 (FR) ................................. 10 52277

(51) Int. Cl.
*B64G 1/28* (2006.01)
*B64G 1/10* (2006.01)
(52) U.S. Cl.
CPC ........... *B64G 1/283* (2013.01); *B64G 1/1021* (2013.01)
(58) Field of Classification Search
CPC ....... B64G 1/283; B64G 1/1021; B64G 1/285
(Continued)

(56) References Cited

U.S. PATENT DOCUMENTS 3,270,985 A     9/1966  Schmidt
3,350,033 A  * 10/1967  Goldberg ..................... 244/165
(Continued)

FOREIGN PATENT DOCUMENTS

FR         2 927 312          8/2009
WO       2007/077350          7/2007
WO     WO 2009150081 A1 * 12/2009  ............... G05D 1/08

OTHER PUBLICATIONS

Grocott et al. "Modular Attitude Control System for Microsatellites with Stringent Pointing Requirements", 2000.*
(Continued)

*Primary Examiner* — Brian M O'Hara
*Assistant Examiner* — Assres H Woldemaryam
(74) *Attorney, Agent, or Firm* — Young & Thompson

(57) ABSTRACT

A method for controlling an attitude control system (30) for a space vehicle (10), the attitude of the space vehicle being controlled during at least one preparation phase followed by an observation phase during which an image capture is performed. In an attitude control system that includes a maneuvering subsystem (300) which includes at least one reaction wheel, the method includes, during the at least one preparation phase, a preparation step (50), during which commands are issued to the maneuvering subsystem in order to control the attitude of the space vehicle, followed by a step (55) of stopping the at least one reaction wheel prior to the observation phase. In addition, during the observation phase, a fine control subsystem (310) having a lower vibration signature than that of the maneuvering subsystem, is sent commands in order to control the space vehicle's attitude. An attitude control system for a space vehicle is also described.

15 Claims, 3 Drawing Sheets

(58) Field of Classification Search
USPC ......... 244/171, 164, 165, 158.6, 158.7, 3.21
See application file for complete search history.

(56) References Cited

U.S. PATENT DOCUMENTS

| | | | |
|---|---|---|---|
| 3,490,719 A * | 1/1970 | Volpe | B64G 1/24 |
| | | | 244/165 |
| 6,456,907 B1 * | 9/2002 | Reckdahl et al. | 701/13 |
| 6,758,444 B1 | 7/2004 | Peck | |
| 7,654,490 B2 * | 2/2010 | Patel et al. | 244/165 |
| 2004/0124314 A1 * | 7/2004 | Peck et al. | 244/165 |
| 2005/0116111 A1 * | 6/2005 | Fowell | 244/164 |
| 2005/0242241 A1 * | 11/2005 | Peck | 244/165 |
| 2006/0032985 A1 * | 2/2006 | Smith et al. | 244/165 |
| 2007/0023580 A1 * | 2/2007 | Hart et al. | 244/165 |
| 2011/0006162 A1 * | 1/2011 | Sperandei | 244/165 |
| 2011/0168848 A1 * | 7/2011 | Ih et al. | 244/165 |
| 2012/0325970 A1 * | 12/2012 | Hamilton | 244/165 |

OTHER PUBLICATIONS

Verbin et al. "Time efficient closed loop steering laws for rigid satellite large rotational maneuver", 2006.*
Snider et al. "Attitude Control of a Satellite Simulator Using Reaction Wheels and a PID Controller", 2010.*
International Search Report dated Jul. 5, 2011, corresponding to PCT/EP2011/054721.

* cited by examiner

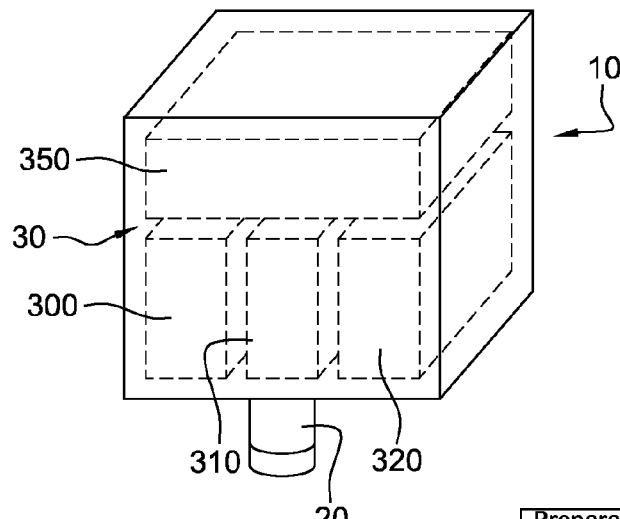
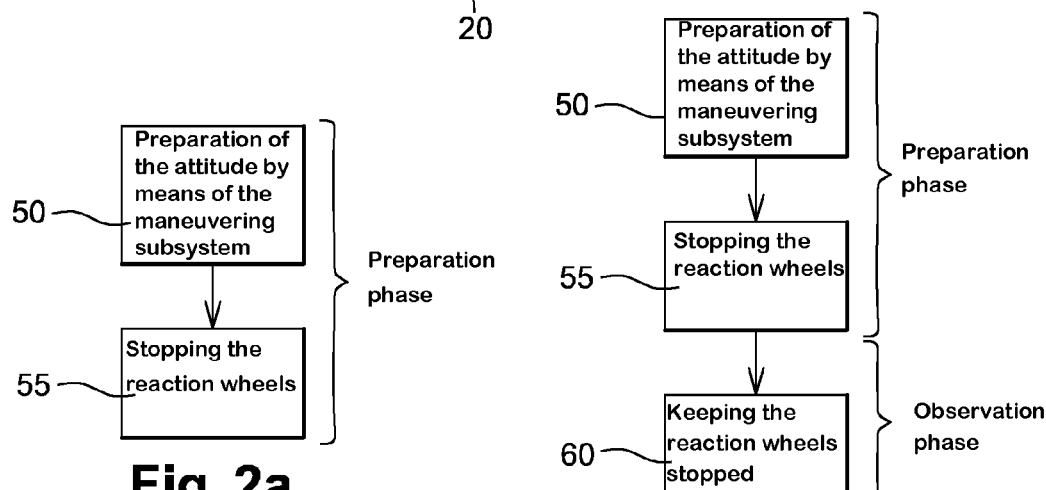
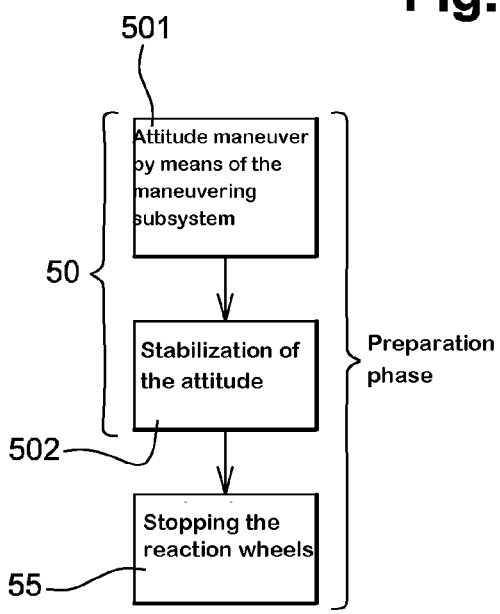

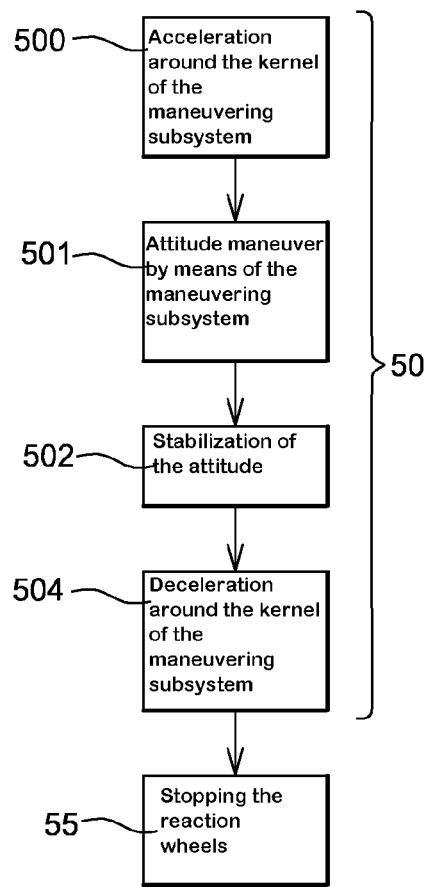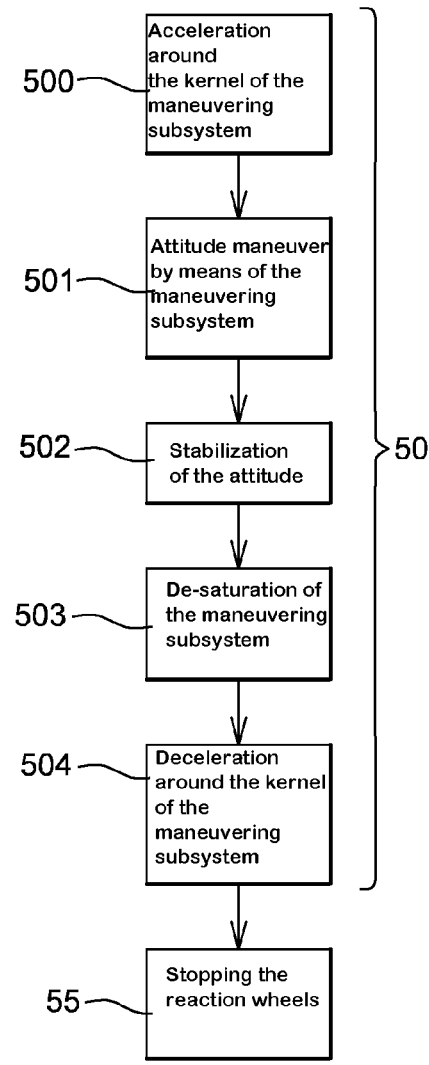
Fig. 2d                    Fig. 2e

METHOD OF COMMANDING AN ATTITUDE CONTROL SYSTEM AND ATTITUDE CONTROL SYSTEM OF A SPACE VEHICLE

This invention belongs to the field of space vehicles' attitude control. More specifically, this invention relates to controlling the attitude of a space vehicle performing an observation mission, whose attitude is changed during preparation phases, followed by observation phases, during which images are captured.

BACKGROUND OF THE INVENTION

In the case, in particular, of very-high-resolution Earth observation missions by satellite either in a low orbit (called "LEO orbit"), at an altitude lower than a few thousand kilometers, or in a high orbit (up to geostationary orbit, called "GEO orbit"), the line of sight of the observation instruments used must have very high stability.

Observation satellites generally have an attitude control system that comprises one or more inertial actuators to align the line of sight of an observation instrument of the satellite with a desired direction, and to stabilize the attitude of this observation instrument during image capture.

For reaction wheel types of inertial actuators, it is known that the rotation of the reaction wheels' unbalance create vibrations that propagate up to the observation instrument's line of sight and degrade the quality of the images. The higher the torque and angular momentum capacity of the reaction wheels used are—and therefore the higher the mass and speed of the rotor—the stronger the vibrations are.

This leads to contradictory requirements in the case of satellites that must execute fast and frequent tilting maneuvers to increase the number of image captures. Indeed, to execute fast maneuvers, high capacity reaction wheels have to be used, which produce strong vibrations during image capture.

In order to limit the vibrations caused by reaction wheels, it is known, in particular from the international application WO 2007/077350, to mount these reaction wheels on a damper that attenuates the amplitude of the vibrations transmitted to the observation instrument. However the vibrations remaining after attenuation are still too strong for the requirements of very-high-resolution observation missions.

It is also known, from the U.S. Pat. No. 6,758,444, to use a number of reaction wheels strictly greater than the number of axes along which the attitude of the satellite is to be controlled, providing at least one additional degree of freedom for controlling the satellite. This additional degree of freedom is used to minimize a cost function representative of the level of vibrations caused by the reaction wheels. However, this method requires knowing an accurate model of the vibrations caused by the reaction wheels. In practice, it is difficult to obtain such a model with sufficient precision, such that the performance will be generally limited and insufficient for the requirements of very-high-resolution observation missions.

SUMMARY OF THE INVENTION

This invention aims at providing an attitude control system for a space vehicle, e.g. an Earth observation satellite, and a method for controlling such a system that allows both the space vehicle's attitude to be modified quickly and the vibrations to be reduced during the observation phases.

This invention relates to a method for controlling an attitude control system of a space vehicle, the attitude control system comprising a maneuvering subsystem which comprises at least one reaction wheel, and the attitude of the space vehicle being controlled during at least one preparation phase followed by an observation phase during which an image capture is performed. According to the invention, the method comprises, during the at least one preparation phase:
- a preparation step, during which commands are issued to the maneuvering subsystem in order to control the attitude of the space vehicle,
- followed by a step of stopping the at least one reaction wheel, during which the speed of rotation of the at least one reaction wheel is set to a substantially zero value prior to said observation phase.

Preferably, in an attitude control system comprising a fine control subsystem having a vibration signature lower than that of the maneuvering subsystem, commands are issued to the fine control subsystem during the observation phase in order to control the space vehicle's attitude.

Preferably, the step of stopping the at least one reaction wheel comprises a closed-loop deceleration or an open-loop braking sub-step of said at least one reaction wheel.

Preferably, in a maneuvering subsystem whose at least one reaction wheel is driven in rotation by a polyphase electric motor, the open-loop braking sub-step consists in short-circuiting the phases of said polyphase electric motor. Preferably, the open-loop braking sub-step is executed when the speed of rotation of the at least one wheel is lower than a predefined threshold.

Preferably, the preparation step comprises a maneuvering sub-step during which commands are sent to the maneuvering subsystem to tilt the attitude of the space vehicle from one observation attitude to another and a sub-step during which commands are issued to the maneuvering subsystem to stabilize the space vehicle's attitude around an observation attitude.

Preferably, the preparation step comprises a sub-step of offloading the maneuvering subsystem, during which all or part of the angular momentum caused by external disturbance torques are compensated for.

Preferably, the offloading is executed by issuing commands to the fine control subsystem and/or by issuing commands to an offloading subsystem of the attitude control system.

Preferably, in a maneuvering subsystem that comprises a plurality of reaction wheels configured such that there exists at least one vector of rotation speeds, not all equal to zero, called "maneuvering subsystem kernel", for which the sum of the elementary angular momenta generated by each of said reaction wheels is substantially zero, the preparation step comprises, at the start of the at least one preparation phase, a sub-step of accelerating the reaction wheels around the maneuvering subsystem kernel. Preferably, the preparation step comprises in addition a sub-step of decelerating the reaction wheels around the maneuvering subsystem kernel, prior to the step of stopping the reaction wheels.

Preferably, the method comprises, during the observation phase, a step of maintaining the at least one reaction wheel stopped, during which the speed of rotation of each reaction wheel is kept at a substantially zero value.

The present invention relates also to an attitude control system for a space vehicle that comprises a maneuvering subsystem comprising at least one reaction wheel, used to control the attitude of the space vehicle during at least one preparation phase, which at least one preparation phase is followed by an observation phase during which an image capture is to be performed. According to the invention, the attitude control system comprises means adapted to stop the at least one reaction wheel before said observation phase.

Preferably, the attitude control system comprises a fine control subsystem having a lower vibration signature than that of the maneuvering subsystem, used to control the attitude of the space vehicle during the observation phase.

Preferably, the attitude control system comprises an offloading subsystem adapted to compensate for all or part of the angular momentum caused by external disturbance torques.

BRIEF DESCRIPTION OF THE DRAWINGS

The invention will be better understood by reading the following description of a non-limiting example, made with reference to the figures, which represent:

FIG. 1: a schematic representation of a satellite comprising an attitude control system according to the invention;

FIGS. 2a, 2b, 2c, 2d and 2e: diagrams illustrating several steps of an attitude control system command method according to various embodiments;

DETAILED DESCRIPTION OF THE PREFERRED EMBODIMENTS

Figure 3A:
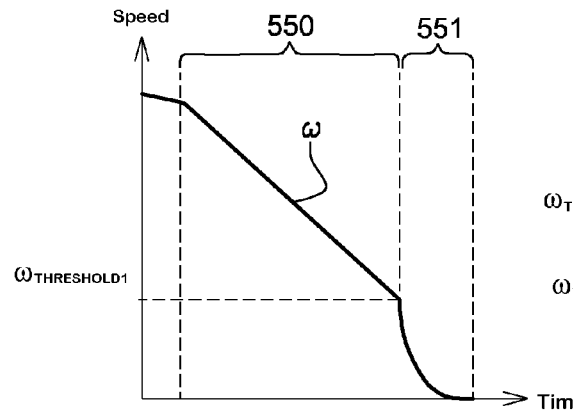
FIGS. 3a and 3b: examples illustrating the speed of rotation of a reaction wheel over time during a stopping step according to the invention.

The invention has a particularly advantageous application, though non-limiting, in the case of the attitude control of a satellite performing a celestial body observation mission, for example an Earth observation mission.

Such an observation satellite is designed to be placed in Earth orbit, for example in a Low Earth Orbit (LEO), a Medium Earth Orbit (MEO) or, preferably, a high orbit, such as a Geostationary Earth Orbit (GEO) or a High Elliptical Orbit (HEO).

To perform its mission, an observation satellite must be positioned in different predefined observation attitudes. Thus, the attitude control of an observation satellite is performed mainly during two recurring phases:
- a phase, called "preparation phase", during which the attitude of the satellite is modified to switch from one observation attitude to another;
- a phase, called "observation phase", during which the satellite performs an image capture.

It should be noted that the satellite's attitude is preferably constant for the duration of an observation phase. This does not preclude the attitude set point from varying during an observation phase.

For example, in the case of an observation satellite moving in a low orbit, the attitude set point can change during the course of an image capture to take the satellite's movement into account and to maintain the line of sight pointing substantially towards a same area on the surface of the Earth.

According to another example, in the case of a satellite in GEO orbit, the attitude set point can change during the course of an image capture to take the Earth's rotation into account and to maintain the line of sight pointing substantially towards a same area on the surface of the Earth.

A satellite's attitude is controlled by forming torques and angular momenta, which can be represented as vectors included in a control space having Nd dimensions, where Nd, in practice, is equal to one, two or three.

If the attitude of the satellite is to be controlled around one axis, the control space's dimension is equal to one. If the satellite's attitude is to be controlled around three axes having different orientations, the control space's dimension is equal to three.

The number of actuators used to control the satellite's attitude, as well as their arrangement, is selected so as to be able to form torques and angular momenta in the chosen control space. For example, with a single reaction wheel, a one-dimension control space is obtained. Three reaction wheels, with axes of rotation having linearly independent unit vectors, allow a three-dimension control space to be obtained.

In the remainder of the description, "elementary torque" and "elementary angular momentum" mean the torque and the angular momentum formed by a single reaction wheel. The sum of the elementary torques formed by several reaction wheels will be referred to as either "torque" or "total torque". In the same way, the sum of the elementary angular momenta formed by several reaction wheels will be referred to as either "angular momentum" or "total angular momentum".

In addition, the attitude of a satellite is controlled by forming one or several elementary torques the norm of which lies within a predefined range.

Within this predefined range, the weak elementary torques are generally used to perform a fine control of the satellite's attitude, whereas strong elementary torques are generally used to quickly tilt the satellite into a different attitude.

In practice, the elementary torques generally used to perform fine attitude control of a satellite are lower than a few tens of millinewton meters, whereas the elementary torques used to tilt a satellite's attitude can reach several hundred millinewton meters or more.

FIG. 1 represents, very schematically, an Earth observation satellite 10. The satellite 10 comprises in particular at least one observation instrument 20, preferably an optical instrument, and an attitude control system 30.

In practice, the satellite 10 also comprises other elements, which are outside the scope of the invention and are not represented on the figures.

The attitude control system 30 comprises a control device 350 and at least a first control subsystem that comprises at least one reaction wheel, called "maneuvering subsystem 300", used during the preparation phases.

The attitude control system 30 also comprises means adapted to stop the at least one reaction wheel of the maneuvering subsystem 300, before each of the observation phases.

"To stop the at least one reaction wheel" means setting the speed of rotation of the at least one wheel to a substantially zero value. "Substantially zero" means that the speed of rotation is low, below a few revolutions per minute or even a few tenths of a revolution per minute; preferably, said speed of rotation is null.

In order to describe implementation examples of the means of stopping the rotation of the at least one reaction wheel, the case of a reaction wheel driven by an electric motor comprising a plurality of coils called "phases" is considered in a non-limiting way.

The control device 350 comprises, for example, an electronic control unit that comprises, in a manner known to the man skilled in the art, a plurality of switches adapted to activate/deactivate each of the phases of said motor, as well as a control module that controls the closing and opening of said switches of the electronic control unit, and which controls the amperage of the current in the activated phase or phases.

The control module comprises for example a microcomputer connected to storage means (magnetic hard disk, RAM and/or ROM memory, optical disk, etc.) by a communication bus. A computer program product is stored in the storage means, in the form of a set of program code instructions, which, when executed by the microcomputer, allow the control method, which will be described in detail below, to be executed. In some embodiments, the control module also comprises specialized electronic circuits of ASIC, FGPA, etc. type.

According to a first example, the rotation of the at least one reaction wheel of the maneuvering subsystem 300 is stopped in a closed-loop.

"In a closed loop" means by means of a feedback loop on the speed of rotation of the at least one reaction wheel, i.e. the control module issues defined commands, depending on the measured speed, so as to cause the measured speed to tend towards a zero speed set point.

However, the performance can be limited in practice by the accuracy of the speed measurements. Indeed, the speed will be forced to the zero speed set point only to within measurement errors, such that vibrations may subsist. In practice, speed sensors, e.g. tachometers, must be sufficiently accurate so that the vibrations caused by a non-zero actual speed of rotation are negligible compared to the maximum tolerable vibrations.

According to another example, the rotation of the at least one reaction wheel of the maneuvering subsystem 300 is stopped in an open-loop.

"In an open-loop" means that the effect of the commands is to brake the at least one reaction wheel, without taking the measured speed into account.

For example, when the at least one reaction wheel is to be stopped, the control module can activate each of the phases of the motor simultaneously, i.e. short-circuit each of the phases of the motor simultaneously. The counter electromotive forces induced by the induction phenomena will act as a viscous friction and the dry friction maintains the complete immobility of the at least on reaction wheel.

This solution has the advantage of not requiring a complex electronic control unit. In particular, it requires no accurate speed sensors, which are required in the case of a closed-loop deceleration of the at least one reaction wheel. However, none of this precludes from providing the control device 350 with a specific electronic control unit to activate each of phases of the motor simultaneously.

The attitude control system 30 is adapted to control the attitude of the satellite 10 in a control space of at least one dimension.

Preferably, the attitude control system 30 is designed to control the attitude of the satellite 10 in a three-dimension control space. For the remainder of the description, the non-limiting case of a three-dimension control space is considered.

In this case, the maneuvering subsystem 300 comprises at least three reaction wheels, arranged such that the unit vectors of the rotational axes of the three reaction wheels are linearly independent.

The control method of the attitude control system 30 of the satellite 10 is executed by the control device 350.

FIG. 2a represents the main steps of the control method during the preparation phases. These steps are, in particular:
a preparation step 50, during which commands are issued to the maneuvering subsystem 300, to command in particular the reaction wheels' speed of rotation, in order to control the attitude of the satellite 10,
a step 55 in which the reaction wheels are stopped, before each observation phase, during which the speed of rotation of the reaction wheels is set to a substantially zero value.

During the preparation step 50, the control device 350 sends one or several commands to the maneuvering subsystem 300, which have the effect in particular of tilting the satellite 10 from one observation attitude to another.

During the step 55 of stopping the reaction wheels, the control device 350 sends one or several commands to the maneuvering subsystem 300, which have the effect of setting the speed of rotation of the reaction wheels to a substantially zero value, before an observation phase and after the preparation step 50.

Note that nothing precludes from continuing the attitude control during the step 55 of stopping the reaction wheels, in particular at the start of this step, when the reaction wheels' speed of rotation is relatively high and if stopping them too abruptly could cause the attitude of the satellite 10 to diverge from the targeted observation attitude.

Nothing precludes, therefore, from issuing commands designed both to stop the reaction wheels (depending on a speed set point) and to control the attitude of the satellite 10 (depending on an attitude set point).

It is understood that, because each reaction wheel of the maneuvering subsystem 300 has been stopped beforehand, said maneuvering subsystem will generate little or no vibration during image capture.

According to a first example, the step 55 of stopping the reaction wheels comprises a sub-step 550 during which commands for closed-loop deceleration of the reaction wheels are issued.

According to another example, the step 55 of stopping the reaction wheels comprises a sub-step 551 during which commands for open-loop braking of the reaction wheels are issued. For example, in the case of reaction wheels driven by polyphase electric motors, the phases of each of the electric motors are short-circuited.

In a preferred embodiment, the step 55 of stopping the reaction wheels comprises a sub-step 550 of closed-loop deceleration of the reaction wheels, followed by a sub-step 551 of open-loop braking of the reaction wheels.

Preferably, the braking sub-step 551 is executed when the measured speed of rotation of at least one reaction wheel (or of each of the reaction wheels) is lower than a predefined threshold, e.g. of the order of a few revolutions per minute.

This example is illustrated by FIG. 3a, which represents the evolution over time of the speed w of rotation of a reaction wheel during the stopping step 55. During the closed-loop deceleration sub-step 550, the speed $\omega$ decreases gradually down to a threshold value $\omega_{THRESHOLD1}$. When the value $\omega_{THRESHOLD1}$ is reached, the open-loop braking sub-step 551 is executed.

The embodiment illustrated in FIG. 3a is advantageous inasmuch as it prevents triggering a reaction wheel braking operation at a high initial speed, especially if it is carried out by short-circuiting the phases of the electric motors, which could lead to a deterioration of the electric motors.

Figure 3B:
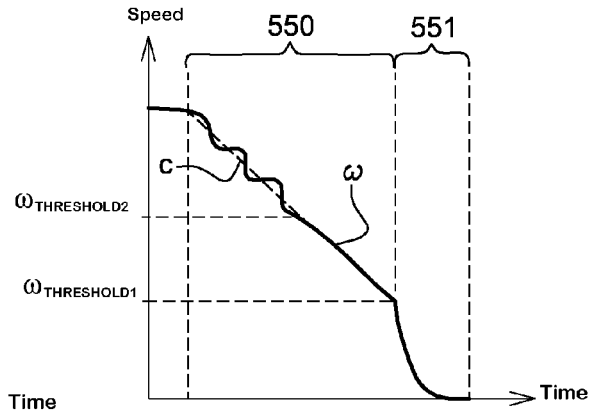

FIG. 3b illustrates a preferred embodiment of the reaction wheels stopping step 55 in which the attitude of the satellite 10 continues to be controlled at the start of the reaction wheels stopping step 55.

In this embodiment, step 55 comprises, as for the example illustrated in FIG. 3a, a sub-step 550 of closed-loop deceleration of the reaction wheels, followed by a sub-step 551 of open-loop braking of the reaction wheels which is executed when the speed of rotation is below the threshold value $\omega_{THRESHOLD1}$.

At the start of the closed-loop deceleration sub-step 550, commands are sent to the maneuvering subsystem 300 both to decelerate the reaction wheels and to control the attitude of the satellite 10. The speed that would be achieved for command orders depending on the closed-loop deceleration set point is represented by a dotted line designated by the reference "c". To this speed is superimposed the speed obtained for commands determined according to the attitude set point, such that the speed ω oscillates substantially around the dotted line c.

Next, when the speed ω of rotation reaches a threshold value $\omega_{THRESHOLD2}$ (greater than the threshold value $\omega_{THRESHOLD1}$, e.g. of the order of a few hundred or tens of revolutions per minute), only commands for closed-loop deceleration of the reaction wheels are sent to the maneuvering subsystem 300, depending on the speed set point.

In addition, nothing precludes from continuing to control the attitude of the satellite 10 until the start of the open-loop braking sub-step 551, which is equivalent to considering thresholds $\omega_{THRESHOLD1}$ and $\omega_{THRESHOLD2}$ to have equal values, e.g. of the order of a few revolutions per minute.

FIG. 2b represents a particular embodiment in which, during the observation phases, the method comprises a step 60 of keeping the reaction wheels stopped.

During the step 60 of keeping the wheels stopped, the control device 350 sends one or several commands to the maneuvering subsystem 300, which have the effect of keeping the speed of rotation of the reaction wheels to a substantially zero value.

Indeed, it can be advantageous to keep the reaction wheels stopped during the observation phases, in order to prevent them from starting up again, e.g. under the effect of parasitic gyroscopic torques, and in order to prevent them from reaching a speed of rotation that could generate vibrations of an amplitude that would disturb image captures.

During the observation phases, the attitude of the satellite 10 can be left uncontrolled, if attitude drifts can be considered as negligible during said observation phases.

In a preferred embodiment, the attitude control system 30 comprises a second control subsystem called "fine control subsystem 310", which is used during the observation phases.

The fine control subsystem 310 is designed such that its vibration signature, i.e. the amplitude of the vibrations it generates when it is used, is lower than that of the maneuvering subsystem 300 and lower than the maximum amplitude tolerated for image captures.

More specifically, the amplitude of the vibrations caused by the fine control subsystem 310 is lower than that of the maneuvering subsystem 300 for the elementary torque values required to carry out the fine attitude control during image captures.

The fine control subsystem 310 comprises at least one actuator, which may be of any suitable type, i.e. any type that allows a low vibration signature to be obtained. This could be, for example, a microwheel, a jet actuator coupled with a chemical or electrical propulsion system, a magnetic actuator, a movable flap modulating solar pressure and creating a torque, etc. In the case of a fine control subsystem 310 comprising several actuators, these can be made up of a combination of actuators from the actuators mentioned above, of the same type or of different types.

Where applicable, the method comprises, during the observation phases, a step, not shown in the figures, of fine control of the satellite's attitude by means of the fine control subsystem 310.

Note that nothing precludes also from using the fine control subsystem 310 outside the observation phases, in particular during the reaction wheels stopping step 55 in order to secure the transition of the attitude control from the maneuvering subsystem 300 to the fine control subsystem 310.

It is understood that using a fine control subsystem 310 with a low vibration signature allows the amplitude of the vibrations caused by the attitude control to be limited during image captures.

In addition, the contradictory requirements, firstly for strong elementary torques to perform attitude tilts and secondly for a low vibration signature to perform image captures, affect different subsystems. The maneuvering subsystem 300 and the fine control subsystem 310 can therefore be optimized by design for the preparation phases and the observation phases, respectively.

In this case, the maneuvering subsystem 300 is designed mainly to provide for an important torque and angular momentum maximum capacity, in order to be able to quickly tilt the satellite 10 and advantageously shorten the duration of the preparation phases. For example, the maximum capacity of the maneuvering subsystem 300 is of the order of 10 newton meter (Nm) and 15 newton meter second (Nms) or greater.

The fine control subsystem 310 can have a maximum capacity significantly lower than that of the maneuvering subsystem 300. For example, the maximum capacity of the fine control subsystem 310 is of the order of 0.1 Nm and 1 Nms. The design of the fine control subsystem 310 can therefore focus mainly on reducing the vibrations induced on the observation instrument 20 of the satellite 10.

FIG. 2c shows a particular embodiment of the method, in which the preparation step 50 comprises a maneuvering sub-step 501 during which commands are issued to the maneuvering subsystem 300 to tilt the satellite 10 from one observation attitude to another and a sub-step 502 during which commands are issued to the maneuvering subsystem 300 to stabilize the attitude of the satellite 10 around the targeted observation attitude.

In a preferred embodiment of the attitude control system 30, the number of reaction wheels is greater than the control space dimension Nd and their arrangement is such that there exists at least Nd reaction wheels for which the rotational axes' unit vectors are linearly independent.

In the case of a three-dimension control space, the maneuvering subsystem 300 comprises at least four reaction wheels, three unit vectors of which are linearly independent.

With such a configuration, it is understood that there must exist a vector of the reaction wheels' speeds of rotation, not all equal to zero, for which the sum of the elementary angular momenta, induced by each of the reaction wheels' rotation, is substantially zero.

This vector of speeds which are not all zero defines a kernel of the maneuvering subsystem 300, in which the total angular momentum formed is substantially zero while reaction wheels are rotating. The kernel of the maneuvering subsystem 300 has at least one dimension, but can have more dimensions if the number of reaction wheels is equal to or greater than five.

$\vec{u}_n$ designates the unit vector of the rotational axis of the $n^{th}$ reaction wheel, and:

$$\vec{H}_n = H_n \vec{u}_n$$

designates the elementary angular momentum of the $n^{th}$ reaction wheel.

In the case of a maneuvering subsystem 300 comprising four reaction wheels, all requests for total angular momentum will be distributed over said four reaction wheels with one degree of freedom.

Indeed, there exists a non-zero vector $(h_1, h_2, h_3, h_4)$ such that:

$$\sum_{n=1}^{4} h_n \vec{u}_n = \vec{0}$$

such that, for any value of a scalar $\lambda$:

$$\vec{H} = \sum_{n=1}^{4} H_n \vec{u}_n = \sum_{n=1}^{4} (H_n + \lambda h_n) \cdot \vec{u}_n$$

The vector of speeds of rotation of the reaction wheels which generates the vector $(h_1, h_2, h_3, h_4)$ corresponds to the kernel of the maneuvering subsystem 300.

Preferably, the reaction wheels are arranged according to a non-singular geometry, i.e. such that the unit vectors of any group of Nd reaction wheels are linearly independent. This way it is ensured that the kernel of the maneuvering subsystem 300 is created by a vector of speeds that are all different from zero, such that all the $h_n$ coefficients are non-zero.

FIG. 2d represents a preferred embodiment in which the preparation step 50 comprises, at the start of the preparation phases, a sub-step 500 during which a command is issued to accelerate the reaction wheels around the kernel of the maneuvering subsystem 300.

"Around the kernel" means, firstly, that the accuracy of the acceleration in the kernel depends on the accuracy of the speed measurements and secondly, that nothing precludes from issuing commands defined both to accelerate the reaction wheels in the kernel (depending on a speed set point) and to control the attitude of the satellite 10 (depending on an attitude set point).

During the sub-step 500 of accelerating the reaction wheels around the kernel of the maneuvering subsystem 300, the speed of rotation of the reaction wheels is gradually increased until non-zero elementary angular momenta, called "elementary biases" are obtained on each of the reaction wheels.

Preferably, the elementary biases are chosen such that the absolute values of the elementary angular momentum excursions for the planned maneuvers do not lead the elementary angular momentum below a predefined threshold. Hence said excursions do not imply going via a null rotation speed. Preferably, the elementary biases are also chosen such that the elementary angular momentum excursions for the planned maneuvers do not imply exceeding a maximum authorized speed of rotation.

At the end of the preparation step 50, each of the reaction wheels will find itself again with an elementary angular momentum close to the elementary bias. In this way, the stabilization sub-step 502, when executed, is carried out with the speeds of rotation of the reaction wheels sufficiently far from the null rotation speed.

This is advantageous inasmuch as, with the current technologies, it is complicated to carry out the stabilization of the reaction wheels with speeds of rotation close to zero. Firstly, the accuracy of the stabilization is highly dependent on the accuracy of the speed measurements and, therefore on the performance of the speed sensors. Secondly, the reaction wheels generally take the form of a rotor mounted on a ball bearing: when the speed of rotation is close to zero, the fluid lubrication film of the ball bearing can be interrupted and the fluctuation of the speed of rotation around zero will generate a dry friction and a local heating that could cause microwelds in the ball bearings.

It is understood that, by ensuring that the stabilization sub-step 502 is executed with speeds of rotation sufficiently far from null speeds, the problems mentioned above are resolved.

Preferably, the preparation step 50 also comprises a sub-step 504, prior to the step 55 of stopping the reaction wheels, during which commands are issued to decelerate the reaction wheels around the kernel of the maneuvering subsystem 300.

As in the acceleration sub-step 500, "around the kernel" means, firstly, that the accuracy of the deceleration in the kernel depends on the accuracy of the speed measurements and secondly, that nothing precludes from issuing commands defined both to decelerate the reaction wheels in the kernel (depending on a speed set point) and to control the attitude of the satellite 10 (depending on an attitude set point).

This sub-step 500, which can be seen in FIG. 2d, allows the speed of rotation of the reaction wheels to be decreased with low total angular momentum, which only slightly modifies the attitude of the satellite 10 achieved at the end of the stabilization sub-step 502.

In another preferred embodiment of the attitude control system 30, which is compatible with any one of the preceding modes, it also comprises an offloading subsystem 320, which can be seen in FIG. 1.

The offloading subsystem 320 comprises actuators adapted to generate torques on the satellite 10 and to decrease the angular momentum of the reaction wheels of the maneuvering subsystem 300 when necessary. Indeed, when said reaction wheels are used to control the attitude of the satellite 10, the cumulative effect of some external disturbance torques acting on the satellite 10 (such as those caused by the residual atmospheric trail, solar radiation pressure or any other external physical phenomena acting on the satellite 10) will cause the elementary angular momentum of at least one of the reaction wheels to increase. To limit this elementary angular momentum excursion, the actuators used must not be inertial actuators.

In a preferred embodiment, the preparation step 50 comprises a sub-step 503 during which a command is issued to offload the maneuvering subsystem 300.

This embodiment is represented in FIG. 2e in the case where it is combined with the mode described in reference to FIG. 2d.

In the example illustrated by FIG. 2e, the offloading sub-step 503 is executed after the stabilization sub-step 502 and before the sub-step 504 of deceleration around the kernel.

It should be noted that the offloading sub-step 503 is executed, in other examples, simultaneously with other sub-steps. In particular, if there exists a model that allows the external disturbance torques to be predicted, their effect can be continuously compensated for, simultaneously to one or several sub-steps of the preparation step 50.

In addition, nothing precludes from performing all or part of the offloading during the reaction wheels stopping step 55 and/or during the observation phase.

Generally, executing the offloading sub-step 503 simultaneously with other sub-steps of the preparation step 50 contributes to decreasing the duration of the preparation phases and to increasing the duration of the observation phases.

Accordingly, the offloading subsystem 320 is used to offload the maneuvering subsystem 300.

Alternatively or in combination with the utilization of an offloading subsystem 320, offloading the maneuvering subsystem 300 is performed by means of the fine control subsystem 310 when this last comprises actuators which are not inertial actuators (e.g. a jet actuator coupled with a chemical or electrical propulsion system, a magnetic actuator, etc.)

Figure 4:
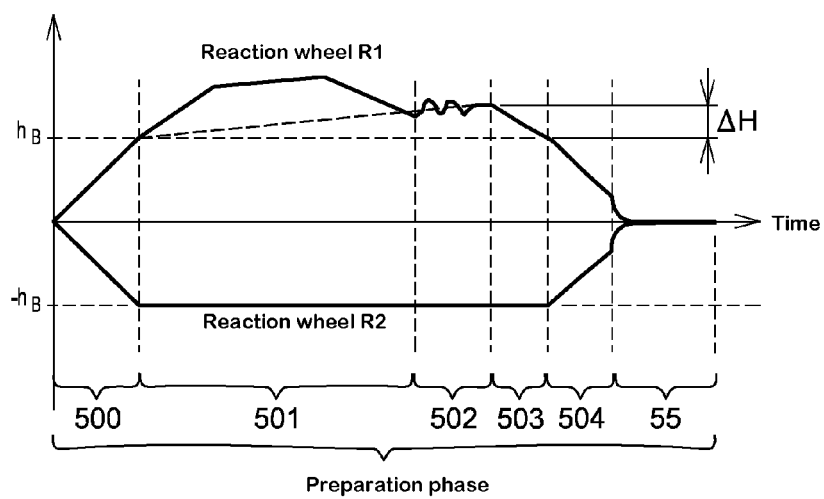
FIG. 4: an example illustrating the control of reaction wheels of a maneuvering subsystem over time according to the invention.

FIG. 4 represents schematically the elementary angular momenta of two reaction wheels of the maneuvering subsystem 300. To increase the clarity of the figures, two reaction wheels $R_1$ and $R_2$ having substantially the same axis of rotation are considered in FIG. 4.

During the sub-step 500 of acceleration around the kernel of the maneuvering subsystem 300, the elementary angular momenta of the reaction wheels $R_1$ and $R_2$ both increase in absolute value, in opposite directions, until they achieve elementary biases called $h_B$ and $(-h_B)$, respectively. During the maneuvering sub-step 501, the elementary angular momentum of the reaction wheel $R_1$ is controlled to tilt the satellite 10.

During the stabilization sub-step 502, the elementary angular momentum of the reaction wheel $R_1$ is controlled, in theory around the elementary bias $h_B$, in order to stabilize the attitude of the satellite 10.

It can be seen that, because of the external disturbance torques, the elementary angular momentum oscillates around an average value greater than the elementary bias $h_B$. The elementary angular momentum caused by said external disturbance torques at the end of the stabilization sub-step 502 is referred to as $\Delta H$.

During the offloading sub-step 503, the bias $\Delta H$ caused by the external disturbance torques is compensated for and the angular momentum of the reaction wheel $R_1$ gradually converges towards the elementary bias $h_B$.

During the sub-step 504 of deceleration around the kernel of the maneuvering subsystem 300, the absolute values of the elementary angular momenta of the reaction wheels $R_1$ and $R_2$ decrease together.

The step 55 of stopping the reaction wheels $R_1$ and $R_2$ is performed, for example, when the speed of rotation of at least one reaction wheel becomes lower than a predefined threshold, e.g. of the order of ten revolutions per minute.

In the example illustrated by FIG. 4, the sub-steps of the preparation step 50 are executed sequentially.

As already discussed, nothing precludes, according to other examples, some of these sub-steps from being executed simultaneously. According to non-limiting examples that can be combined amongst themselves:

the execution of the maneuvering sub-step 501 begins before the end of the sub-step 500 of acceleration around the kernel, the execution of the stabilization sub-step 502 continues during the offloading sub-step 503 and/or the sub-step 504 of deceleration around the kernel;

the offloading sub-step 503 is executed continuously during the preparation phases, etc.

The invention claimed is:

1. A method for controlling an attitude control system (30) of a space vehicle (10) where the attitude control system has a maneuvering first subsystem that includes at least one reaction wheel, comprising:

controlling an attitude of the space vehicle (10) during at least one preparation phase; and following said controlling, performing an observation phase during which an image capture is performed;

wherein the at least one preparation phase comprises the following sub-steps:

a preparation step (50), during which commands are issued to the maneuvering first subsystem in order to control the attitude of the space vehicle (10) such that the attitude of said space vehicle is tilted from one observation attitude to another, and following said preparation step, a step (55) in which the at least one reaction wheel is stopped after the wheel has started moving, during which the speed of rotation of the at least one reaction wheel is set to a substantially zero value prior to each observation phase, wherein, during the observation phase, commands are issued to a fine control second subsystem (310) that further controls the attitude of the space vehicle (10), said fine control second subsystem comprising at least one actuator and having a lower vibration signature than that of the maneuvering first subsystem, and wherein the preparation phase and the observation phase are recurring phases.

2. The method according to claim 1, wherein the step (55) in which the at least one reaction wheel is stopped comprises a sub-step (550) of closed-loop deceleration of said at least one reaction wheel.

3. The method according to claim 1, wherein the step (55) in which a stopping of the at least one reaction wheel occurs comprises a sub-step (551) of open-loop braking the at least one reaction wheel.

4. The method according to claim 3, wherein the at least one reaction wheel is driven in rotation by a polyphase electric motor, and the open-loop braking sub-step (551) consists in short-circuiting the phases of said polyphase electric motor.

5. The method according to claim 3, wherein the open-loop braking sub-step (551) is executed when the speed of rotation of the at least one wheel is lower than a predefined threshold.

6. The method according to claim 1, wherein the preparation step (50) comprises a maneuvering sub-step (501) during which commands are issued to the maneuvering subsystem to tilt the space vehicle's attitude from one observation attitude to another and a sub-step (502) during which commands are sent to the maneuvering subsystem to stabilize the attitude of the space vehicle (10) around the targeted observation attitude.

7. The method according to claim 1, wherein the preparation step (50) comprises a sub-step (503) of offloading the maneuvering subsystem, during which all or part of the angular momenta caused by external disturbance torques are compensated for.

8. The method according to claim 7, wherein the offloading is executed by sending commands to the fine control subsystem (310) and/or by sending commands to an offloading subsystem (320) of the attitude control system (30).

9. The method according to claim 1,
wherein, the maneuvering first subsystem comprises a plurality of reaction wheels configured such that there exists at least one vector of rotation speeds, not all equal to zero, for which a sum of elementary angular momenta generated by each of said reaction wheels is substantially zero, and
wherein the preparation step (50) comprises, at the start of the at least one preparation phase, a sub-step (500) of accelerating the reaction wheels around the maneuvering subsystem kernel.

10. The method according to claim 9, wherein the preparation step (50) comprises a further sub-step (504) of decelerating the reaction wheels prior to the step (55) of stopping the reaction wheels.

11. The method according to claim 1, further comprising:
during the observation phase, a step (60) of maintaining the at least one reaction wheel stopped, during which the speed of rotation of each reaction wheel is kept at a substantially zero value.

12. An attitude control system (30) for a space vehicle (10), comprising:
a maneuvering first subsystem comprised of at least one reaction wheel, that controls an attitude of the space vehicle during at least one preparation phase during which the attitude of said space vehicle is tilted from one observation attitude to another, said preparation phase being followed by at least one observation phase during which image captures are performed;
means adapted to stop the at least one reaction wheel after the reaction wheel has started moving, before said observation phase; and
a fine control second subsystem (310), used to control the space vehicle's (10) attitude during the at least one observation phase, said fine control second subsystem comprising at least one actuator and having a lower vibration signature than that of the maneuvering first subsystem,
wherein the preparation phase and the observation phase are recurring phases.

13. The system (30) according to claim 12, further comprising:
an offloading subsystem (320) configured to compensate for all or part of the angular momenta caused by external disturbance torques.

14. The method according to claim 2, wherein the step (55) in which the at least one reaction wheel is stopped comprises a sub-step (551) of open-loop braking the at least one reaction wheel.

15. The method according to claim 3, wherein the open-loop braking sub-step (551) is executed when the speed of rotation of the at least one wheel is lower than a predefined threshold.

* * * * *